United States Patent Office 2,973,885
Patented Mar. 7, 1961

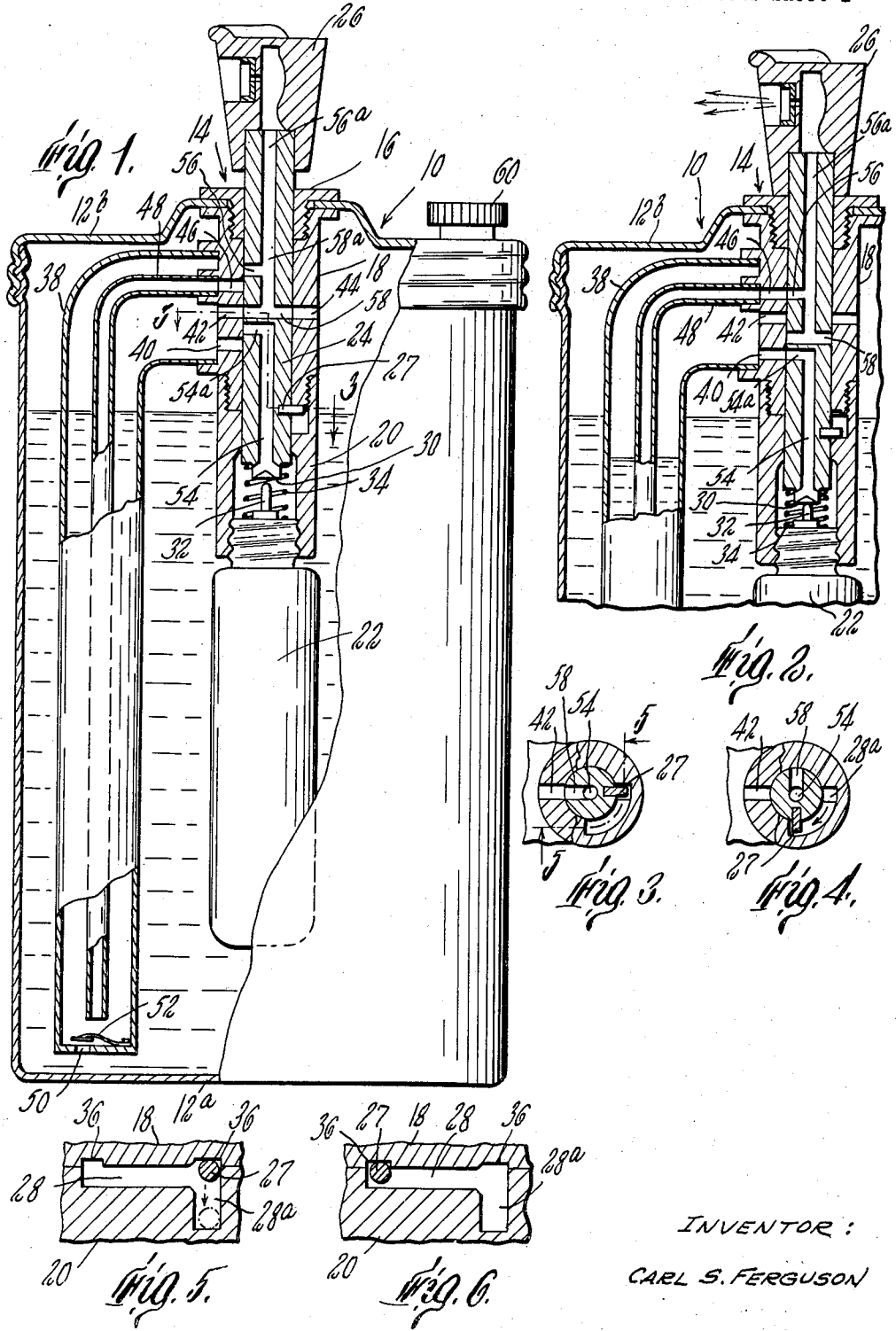

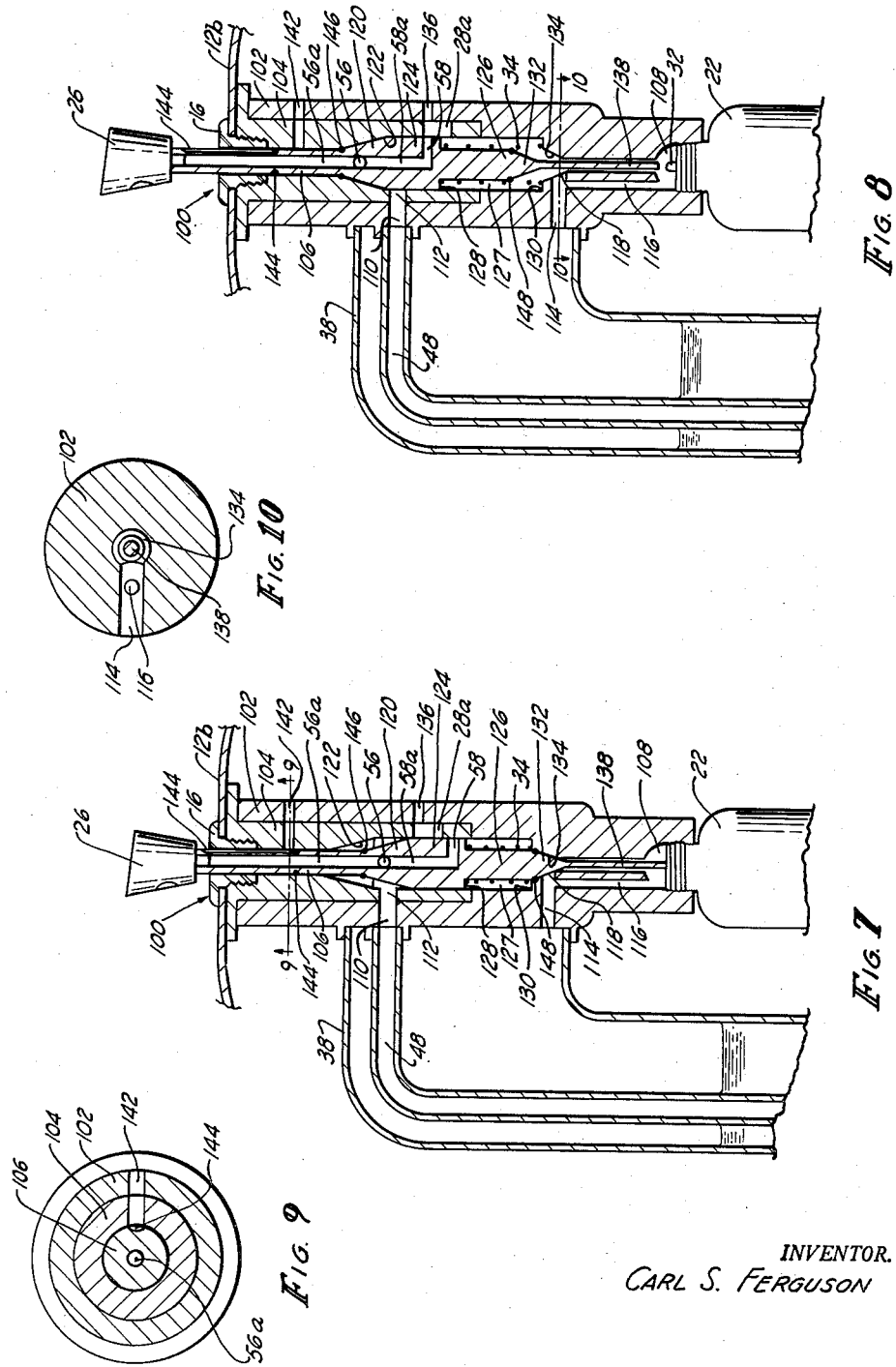
March 7, 1961
C. S. FERGUSON
2,973,885
PRESSURIZABLE DISPENSER
Filed April 11, 1960
2 Sheets-Sheet 2
INVENTOR.
CARL S. FERGUSON

2,973,885
PRESSURIZABLE DISPENSER

Carl S. Ferguson, Fort Lauderdale, Fla., assignor to A. E. Staley Manufacturing Company, Decatur, Ill., a corporation of Delaware Filed Apr. 11, 1960, Ser. No. 21,563
14 Claims. (Cl. 222—399)

This invention relates to an improved pressurizable dispenser, and more particularly to such a dispenser in which the materials to be dispensed are maintained in isolation from the pressurizing materials except during actual dispensing, and in which the material to be dispensed is maintained at atmospheric pressure except while actually being dispensed.

Dispensers have heretofore been disclosed in which the propellant material is kept separate from the active ingredient or material to be sprayed or otherwise dispensed. In certain of these prior art devices, however, the material to be dispensed has been held constantly under the pressure of the pressurizing material. This has resulted in numerous disadvantages, including leakage of the active ingredient from its container, changes in consistency and other deterioration of the active ingredient owing to the pressure imposed thereon, and a tendency to cause plugged valves and conduits generally. It has also been proposed to make a dispenser in which the material to be dispensed and pressurizing material are kept separate, but in which, by venting, the pressure on the active ingredient is reduced to atmospheric pressure after each dispensing operation. However, in such devices heretofore proposed, each dispensing operation resulted in the loss of large quantities of the pressurizing material, increasing overall dispenser expense and size, per unit of active ingredient dispensed.

A primary object of the present invention is to provide a pressurizable dispenser in which the pressurizing fluid is out of contact with the active ingredient (except when actually dispensing), the pressure acting on the active ingredient is reduced to atmospheric pressure after each dispensing operation, and, in addition, the loss of pressurizing material at each dispensing operation is reduced to an extremely small amount.

A further object is to provide such a dispenser in which it is unnecessary to use a collapsible separate container for the active ingredient. Still another object of the invention is to provide a dispenser with which the user may alternately spray, squirt, or otherwise dispense under pressure (including foam-free spraying of water emulsions using conventional propellants), or, by removing a closure, readily remove or add active ingredient without impairing further pressurized operation upon replacing the closure. A further object is to provide simple and improved constructions to facilitate ease and economy of manufacture and trouble-free operation, including improved valve and conduit arrangements for dispensing and venting (with blowing of the nozzle and passages to clear it at each venting to minimize possible clogging). Still another object is to provide, in such a dispenser, improved locking means to prevent accidental dispensing, as, for example, in transit or storage.

An important feature of the present invention is a pressure chamber of volume small relative to the volume of the active ingredient container, the pressure chamber having an opening near the bottom of the active ingredient container. The opening is equipped with a check valve to admit active ingredient to the pressure chamber and to prevent flow in the reverse direction. The pressure chamber is adapted to be placed in communication with the pressurizing fluid whenever dispensing is desired. In the chamber, there is a delivery tube open near the bottom of the chamber. The material to be dispensed is forced from the pressure chamber through the delivery tube and ultimately out through a nozzle. The pressure chamber is vented following each dispensing operation, but in view of the small volume of the pressure chamber, relatively little pressurizing fluid is lost in this manner.

To facilitate the alternate dispensing of material and the blowing and venting, there is an improved valve arrangement which is an important feature of the invention. The improved valve arrangement includes a valve stem which is reciprocable between two positions. In the first, or dispensing position, the pressurizing fluid is applied to the active ingredient in the pressure chamber, the check valve is closed and the delivery tube communicates with the dispensing nozzle. In the second, or venting position, the delivery tube is sealed, the check valve is permitted to open to refill the pressure chamber and the pressure chamber and active ingredient container are vented. In the dispensing position the valve stem also operates the valve on a source of pressurizing fluid.

Other objects, advantages and features of the invention will appear from the following description of two preferred embodiments thereof, taken together with the drawings of the same, in which:

Figure 1 is a partly diagrammatic side elevation, partially in section, of one embodiment showing the relation of the parts during venting;

Figure 2 is a partial view corresponding to Figure 1 but showing the dispenser actuated and in dispensing condition;

Figure 3 is a sectional view taken at 3—3 of Figure 1 with the locking mechanism in venting position, and showing the venting conduit arrangement for the pressure chamber;

Figure 4 is a view corresponding to Figure 3, but showing the dispenser locked in closed position;

Figure 5 is a sectional view at 5—5 of Figure 3;

Figure 6 is a view corresponding to Figure 5 but showing the dispenser in the locked position of Figure 4;

Figure 7 is a partly diagrammatic elevation, partly in section, of a valve and dispensing arrangement of a second embodiment showing the relation of the parts during dispensing;

Figure 8 is a partly diagrammatic vertical elevation, partly in section, the same as Figure 7 except that the parts are in venting relation;

Figure 9 is a slightly enlarged horizontal section on the line 9—9 through the valve arrangement in Figure 7 to show the venting of the active ingredient container during dispensing; and Figure 10 is a slightly enlarged horizontal section on the line 10—10 of Figure 8 to show the means for venting the pressure chamber.

Referring now more particularly to the drawings, there is shown in Figure 1 a dispenser indicated generally at 10. The dispenser comprises a container for active ingredient which has a cup-shaped, threaded wall 12a and a screw top 12b screwed on the threads of wall 12a. Axially secured in the dispenser 10, and dependent from the top 12b thereof, is a valve assembly indicated generally at 14. The valve assembly 14 includes a bushing 16 and shaft section 18 secured together by screw threads with the top 12b held therebetween. Secured to the section 18 by screw threads is a mounting 20, in which the pressurizing-fluid tank 22, having a valve 32, is mounted by screw threads. Seated within the bushing 16, section 18 and mounting 20 for slidable axial movement relative thereto is the stem 24, having in its upper portion an axial dispensing conduit 56a. The stem is fitted with a conventional dispensing nozzle 26 communicating with conduit 56a. Extending through the wall of stem 24 from axial conduit 56a, there are a radial dispensing conduit 56 and a diametrical venting conduit 58, both in the same axial plane.

Secured in the stem 24 near the opposite end there is a radial guide pin 27. When the nozzle 26 is depressed slightly, the stem 24 may be rotated 90° by virtue of a guideway 28 cut into the upper portion of the mounting 20. At one extremity of the 90° travel, conduits within the stem 24 are rotated into the same axial plane as conduits in the section 18 (as shown in Figures 1, 2 and 3). Also, at this position, a downward continuation 28a of the guideway (Figures 5 and 6) is provided in the mounting 20 to permit the pin 27 to travel downwardly against the contrabiasing spring 34 to the position shown in Figure 2. This downward movement causes the bottom surface 30 of the stem 24 to engage the valve 32 and to open the same and release the pressurizing fluid. (The pressurizing fluid may be a fluorinated hydrocarbon, methylene chloride or any desired propellant. At the other extremity of the 90° travel of the pin 27, downward movement is impossible. Also, at this position, the guideway 28 has a detent 36 (Figures 5 and 6) formed in the lower surface of the section 18. In view of the upward bias of spring 34, the stem is held firmly in the position in which the plane defined by the axes of the valve-stem conduits is at an angle of 90° to the plane defined by the axes of the conduits in section 18.

Secured in sealed manner in one side of the section 18 is pressure chamber 38. Opening into the pressure chamber and extending through the adjacent wall of the section 18 are a pressure conduit 40 and a venting conduit 42. An additional venting conduit 44 coaxial with conduit 42 extends through the opposite wall of the section 18 to the air space above the active ingredient in container 12a—12b. Section 18 also has a third, or dispensing, conduit 46 through its wall between the valve stem and the pressure chamber 38. A dispensing tube 48 is sealed and secured at one end to the section 18 at the opening of dispensing conduit 46. The tube 48 extends down through the pressure chamber 38, ending near the bottom thereof, where it is open to receive material to be dispensed.

In the bottom of pressure chamber 38 there is a check valve which comprises a small opening 50, with a cooperating check valve member 52, which may suitably be a flat piece of polyethylene moving on a flexible polyethylene support secured to the interior of the pressure chamber 38.

The lower portion of stem 24 has an axial pressure conduit 54 and a radial pressure conduit 54a through the wall of the stem from axial conduit 54. As shown particularly in Figure 2, when in dispensing position, radial conduit 54a is in alignment with the pressure conduit 40 through the section 18. At the same time, the radial dispensing conduit 56 of the stem 24 is in alignment with the dispensing conduit 46 of the section 18, while the venting conduit 58 is out of alignment with the venting conduits 42 and 44. As shown particularly in Figure 1, when the nozzle 26 is released, the spring 34 forces the stem 24 upward to its venting position so that the venting conduits 42, 58, and 44 are in alignment, while the respective pressure conduits and dispensing conduits are no longer in communication.

A closure 60 attached (by threads not shown) to the top 12b of the container makes possible the addition or removal of contents, as desired, without affecting future pressure-dispensing.

In operation, the dispenser 10 is filled to any desired level with the active ingredient to be dispensed, which may, for example, be an aqueous floor wax composition, a furniture wax or polish, paint, insecticide or window cleaner. If a quantity of the active ingredient is desired for some other purpose, the closure 60 may be removed and the desired quantity poured out, whereupon the closure may be replaced (although this is unnecessary except to avoid spillage). When a spray or other stream of pressure-dispensed active ingredient is desired, the nozzle 26 is simply depressed to its dispensing position (Figure 2), whereupon the pressure conduits 54, 54a, and 40 are brought into communication, the dispensing conduits 46, 56, and 56a are brought into communication and pressure fluid is released from the tank 22 into pressure chamber 38. Pressure is thus exerted on the upper surface of the active ingredient within the chamber 38. The pressure on the active ingredient closes the check valve 52, and active ingredient is forced through the dispensing tube 48, and out, by way of conduits 46, 56, and 56a, through the nozzle 26. When the nozzle 26 is released (Figure 1), the spring 34 forces the stem 24 upwardly to its venting position so that the pressure and dispensing conduits are out of alignment, and the venting conduits 42, 58, and 44 are brought into alignment. This vents the pressure chamber 38 and the airspace above the surface of the active ingredient in the dispenser or container generally through venting conduit 58, the dispenser conduit 56a and the nozzle to the atmosphere. At this point, due to the difference in the head of active ingredient between the chamber 38 and the container 12a—12b, active ingredient flows into the pressure chamber 38 through the opening 50.

A second embodiment is illustrated in Figures 7, 8, 9, and 10 in which like parts are numbered the same as in Figures 1–6 and the locking mechanism is omitted for clarity of illustration. In the second embodiment, there is a valve assembly, indicated generally at 100, of somewhat different structure but performing the same functions. The valve assembly comprises a hollow valve body 102 and hollow valve insert 104 secured and sealed axially (by means not shown) in a counterbore from the upper end of the valve body. Axially reciprocable in the valve insert 104 there is a valve stem 106 fitted with a conventional dispensing nozzle 26 at its outer end.

The valve assembly, as in the embodiment already described, depends from the top 12b of active ingredient container 12a—12b. To hold the valve assembly in place, there is a threaded, flanged bushing 16 which is received in the internally threaded end of the valve insert 104 with the top 12b of the container gripped between the bushing flange and valve insert.

At its lower end, the valve body 102 is counterbored at 108 and threaded to engage the threads on a tank of pressurizing fluid 22 and seal them so that pressurizing fluid will flow into the counterbore when the tank valve 32 is opened, as described hereafter.

Mounted in sealed relationship in one side of valve body 102 is the pressure chamber 38 (as in Figures 1 and 2). The valve body and valve insert 104 have radial dispensing conduits 110 and 112, respectively, assembled in permanent alignment and communicating between chamber 38 and the interior of valve insert 104. The structure of the chamber 38 is the same as that of Figures 1 and 2 with a dispensing tube 48 sealed at its upper end to the valve body at the radial dispensing conduit 110. Similarly, the valve body has a radial pressure conduit 114 opening into pressure chamber 38 to deliver pressurizing fluid thereto.

Communicating between pressure conduit 114 and counterbore 108, there is an axial pressure conduit 116 parallel to but offset from the axis of the valve body and the valve stem. Pressure conduits 114 and 116 both communicate with the interior of the valve body through a vent port 118 in the interior wall of the valve body.

The valve stem 106 is reciprocable along the common axis of the valve insert 104 and valve body 102. The uppermost portion of the valve stem 106 is cylindrical and fits closely within the valve insert 104. Just below the cylindrical portion, the stem flares outwardly to form a frusto-conical upper valve member 120. The valve insert 104 has a valve seat 122 adapted to mate with valve member 120 to form a fluid-tight seal; the seat 122 likewise has a frusto-conical surface flaring outward. Next adjacent to the valve member 120, the valve stem has an enlarged cylindrical portion 124 with a slide fit in valve insert 104. Next adjacent to the enlarged portion 124, the valve stem has a cylindrical portion 126 of reduced diameter, thereby leaving a shoulder 128 on the enlarged portion 124 and forming an annular chamber 127 with the interior walls of the valve insert and valve body. The valve body is counterbored to form a shoulder 130 opposite the shoulder 128 and the spring 34 is compressed between the shoulders 128 and 130 biasing the stem upward away from the tank 22 of pressurizing fluid.

Next adjacent to the reduced portion 126 of the valve stem, there is a second frusto-conical valve member 132, formed as the valve stem is tapered inwardly. A mating valve seat 134 is formed in the valve body, and the vent port 118 is in the valve seat 134 so that the valve stem is reciprocable between two positions: in the upper position, upper valve 120—122 is closed and lower valve 132—134 is open and in the lower position upper valve 120—122 is open and lower valve 132—134 is closed. Thus valve member 132 is adapted to seal vent port 118 when member 132 mates with seat 134.

In order for active ingredient to be dispensed, the valve stem has an axial dispensing conduit 56a and a-dial conduit 56, conduit 56a communicating between the radial dispensing conduit 56 and the nozzle 26. The radial conduit 56 is located in the upper valve member 120 so that conduit 56 is sealed when valve member 120 mates with the upper valve seat 122.

Located in the enlarged portion 24 of the valve stem there is a radial vent conduit 58, and an axial vent conduit 58a communicates between conduit 58 and dispensing conduit 56a.

While the guide pin 27 and guideway 28 have been omitted from Figures 7 and 8, the downward continuation 28a of the guideway is shown. This is a vertical slot through the wall of valve insert 104 adjacent to the enlarged portion 124 of the stem. The guideway continuation 28a is so shaped and positioned relative to enlarged portion 124 and radial vent conduit 58a that, in the depressed position of the valve stem, conduit 58a is closed by the wall of valve insert 104 while in the released position the conduit 58a is open to guideway continuation 28a which, in turn, communicates with annular chamber 127. Also, there is a vent port 136 in the wall of valve body 102 communicating between the interior of container 12a—12b and guideway continuation 28a.

The valve stem 106 (and particularly valve member 132 thereof) terminates in an elongated push-rod 138 which is slidable in a push-rod guide 140 between the lower valve seat 134 and the counterbore 108. The push-rod 138 serves to open the valve of the pressurizing fluid tank when the valve stem is depressed.

In operation, the valve stem is turned 90° (as described before with references to Figures 1–6) and depressed by manual pressure against resisting bias of spring 34 until valve member 132 is seated in valve seat 134, as shown in Figure 7. This closes vent port 118, and the push-rod 138 engages the valve of pressurizing fluid tank 22, opening it and permitting the pressurizing fluid to flow into counterbore 108, through pressure conduits 116 and 114 into pressure chamber 38, where pressure is applied to the active ingredient to be dispensed. At the same time, in this position of the valve stem, upper valve member 120 is separated from valve seat 122, thereby opening radial dispensing conduit 56 to the dispensing conduits 110 and 112. With the pressure applied on the active ingredient in chamber 38, the ingredient is forced through dispensing tube 48, through dispensing conduits 110 and 112 and into the valve stem through conduit 56. Thence the active ingredient flows through the conduit 56a to the nozzle whence it is delivered. At this position of the valve stem, vent conduit 58a is closed by the wall of valve insert 104.

When the valve stem is released (Figure 8), the spring 34 forces the stem upward to seat the upper valve member 120 in its seat 122, thereby cutting off the flow of active ingredient through conduit 56. This upward movement disengages the push-rod from the valve of the pressurizing fluid tank 22 cutting off the flow of pressurizing fluid and opens lower valve 132—134 permitting pressurizing fluid in chamber 38, counterbore 108 and conduits 114 and 116 to flow into annular chamber 127. Thence the pressurizing fluid is vented through keyway continuation 28a into and through conduits 58, 58a, and 56a to the atmosphere through the nozzle 26. At the same time, the interior of container 12a—12b is vented to the atmosphere through vent port 136, guideway continuation 28a, vent conduit 58a and so on to the atmosphere.

Depending on the materials used and on the dimensional tolerances in fabrication, it may be desirable to use gaskets to assure a positive seal of the stem. Three such gaskets, of the O-ring type, as shown in Figures 7 and 8: the uppermost gasket 144 is on the stem near the bushing 16 when the stem is in released position, the second gasket 146 is mounted at the narrow end of the upper valve member 120 to afford a positive seal of the valve 120—122; and the third gasket 148 is mounted at the broad end of lower valve member 132 to afford a positive seal of valve 132—134.

To assure that the pressure in the container 12a—12b is always atmospheric and to eliminate any chance of increased pressure therein during dispensing, a novel and simple venting arrangement is provided. Venting is accomplished by means of a vent conduit 142 through the walls of the valve body 102 and valve insert 104. Cooperating with conduit 142 is an axial vent slot 144 depressed in the wall of stem 106 near its upper end and in the same axial plane as conduit 142 when the stem is in dispensing position. The slot 144 and conduit 142 are so arranged and adapted that, when the stem is depressed, the internal end of slot 144 is opposite and open to conduit 142 while the other end is open to the atmosphere. When the stem is released, the internal end of the slot is displaced from the conduit 142 and no longer communicates therewith, the container being vented through port 136 and vent conduit 58, as described.

This application is a continuation-in-part of my co-pending application, Serial No. 767,976, filed October 17, 1958, now abandoned.

Other embodiments of the invention, within the scope of the appended claims, will of course occur to those skilled in the art.

I claim:

1. A dispenser comprising a container adapted to hold a body of liquid to be dispensed, a pressure chamber having an inlet from said container for admission of said liquid, means associated with said inlet to resist flow through said inlet from said chamber, a source of pressurizing fluid operatively associated with said pressure chamber to discharge thereinto when dispensing, a valve body in said container, a valve stem reciprocable in said valve body to a first position and to a second position and means operatively associated with said stem for venting said pressure chamber to the atmosphere when said stem is in said first position, said valve body having dispensing conduit means in sealed communication with said chamber to receive liquid to be dispensed, said valve stem having dispensing conduit means to deliver liquid to a nozzle, said respective dispensing conduit means being in communication with each other at said second position and out of communication with each other at said first position.

2. A dispenser for selectively discharging liquid from a pressure chamber communicating with a body of said liquid in a container for the same and provided with an inlet and means to permit movement of fluid only into said chamber and a dispensing passage for movement of liquid therefrom which comprises a valve body, a valve stem, and a source of pressurizing fluid, said valve stem being slidably mounted in said valve body for limited movement between a first position and a second position to selectively actuate said pressurizing-fluid source when moved to said second position, said valve body including a pressure conduit in sealed communication with said pressure chamber and a dispensing conduit in sealed communication with said dispensing passage, said valve stem including a conduit to a dispensing orifice, said source being mounted to provide pressure to said pressure conduit when actuated by said valve stem, and said valve stem conduit being in communication with said dispensing conduit when said valve stem is in said second position and in venting communication with said pressure chamber when said valve stem is at said first position.

3. The dispenser of claim 2 in which said valve stem conduit is in venting communication through said valve body with said container above the body of liquid when said stem is at its first position.

4. The combination of claim 2 which includes an additional opening in said container large enough to pour through, and a closure therefor.

5. A dispenser which comprises a container for liquid to be dispensed, and, mounted within said container, a valve assembly including a valve body provided with a pressure conduit, a dispensing conduit, and a pair of venting conduits, and, limitedly axially reciprocable therein, a stem provided with a pressure conduit, a dispensing conduit, and a venting conduit, said respective pressure conduits and said respective dispensing conduits being aligned at one extremity of travel of said stem whereupon said respective venting conduits are out of alignment, but said venting conduits being aligned at the opposite extremity of said stem travel, whereupon said pressure and disepnsing conduits are out of alignment, a pressure chamber mounted in sealed relation to said valve body, and with said valve body pressure conduit opening thereinto, and with a lower end toward the bottom of said container and provided thereat with an opening, check valve means associated with said opening to oppose loss of pressure therethrough from said pressure chamber, a dispensing tube having its lower end in communication with said pressure chamber and its upper end sealed into said valve body, said valve body dispensing conduit opening thereinto, a source of pressurizing fluid provided with a valve opening responsive to the downward movement of said stem, and means biasing said stem upwardly away from said valve, one of said valve body venting conduits opening into said pressure chamber and the other thereof opening into said container.

6. A dispenser which comprises a container to hold a body of liquid to be dispensed and, mounted within said container, a valve assembly dependent from the top of said container and including a valve body generally annular in cross-section and provided with a pressure conduit, a dispensing conduit, and a pair of venting conduits, and, limitedly axially reciprocable therein, a stem provided with a pressure conduit, a dispensing conduit, and a venting conduit, said respective pressure conduits and said respective dispensing conduits being aligned at one extremity of travel of said stem whereupon said respective venting conduits are out of alignment, but said venting conduits being aligned at the opposite extremity of said stem travel whereupon said pressure and dispensing conduits are out of alignment, a pressure chamber with an upper end at said valve body in sealed relation thereto and with said valve body pressure conduit opening thereinto, and with a lower end toward the bottom of said container and provided thereat with an opening, check valve means associated with said opening to oppose loss of pressure therethrough from said pressure chamber, a dispensing tube disposed in said pressure chamber with the upper end thereof sealed to said valve body, said valve body dispensing conduit opening thereinto, and with the lower end thereof open and adjacent the lower end of said pressure chamber, a source of pressurizing fluid secured to the lower portion of said valve assembly, said source being provided with a valve opening responsive to the downward movement of said stem, and means biasing said stem upwardly away from said valve, one of said valve body venting conduits opening into said pressure chamber and the other thereof opening into said container.

7. A dispenser comprising a container adapted to hold a body of liquid to be dispensed, a pressure chamber having an inlet from said container for admission of said liquid, valve means associated with said inlet to resist flow through said inlet from said chamber, a valve assembly mounted in said container and including a valve body in sealed relation to said chamber and a valve stem reciprocable in said valve body to a first position and to a second position, a source of pressurizing fluid in sealed communication through said valve body with said chamber and actuable by said valve stem in said second position and means biasing said stem toward said first position, said valve stem having dispensing conduit means to receive liquid to be dispensed and deliver it to a nozzle and also having vent conduit means, said valve body having dispensing conduit means and vent conduit means communicating with said chamber, said respective dispensing conduit means being in communication at said second position and out of communication at said first position and said respective venting conduit means being in communication at said first position and out of communication at said second position, said valve stem and body including means for positively sealing said valve stem dispensing conduit means in said second position.

8. A dispenser comprising a container adapted to hold a body of liquid to be dispensed, a pressure chamber having an inlet from said container for admission of said liquid, valve means associated with said inlet to resist flow through said inlet from said chamber, a valve assembly mounted in said container and including a valve body in sealed relation to said chamber and a valve stem reciprocable in said valve body to a first position and to a second position, a source of pressurizing fluid in sealed communication through said valve body with said chamber and actuable by said valve stem in said second position and means biasing said stem toward said first position, said valve stem having dispensing conduit means to receive liquid to be dispensed and deliver it to a nozzle and also having vent conduit means, said valve body having dispensing conduit means and vent conduit means communicating with said chamber, said respective dispensing conduit means being in communication at said second position and out of communication at said first position and said respective venting conduit means being in communication at said first position and out of communication at said second position, said valve stem and body including means for positively sealing said valve body vent conduit means at said second position, said valve stem and body also including means for positively sealing said valve stem dispensing conduit means at said first position.

9. A dispenser comprising a container adapted to hold a body liquid to be dispensed, a pressure chamber having an inlet from said container for admission of said liquid, valve means associated with said inlet to resist flow through said inlet from said chamber, a valve assembly mounted in said container and including a valve body in sealed relation to said chamber and a valve stem reciprocable in said valve body to a first position and to a second position, spring means biasing said stem toward said first position, and a tank of pressurizing fluid in sealed communication through said valve body to said chamber and actuable by said valve stem in said second position, a first and a second valve member on said valve stem, a first and a second valve seat in said valve body adapted to mate with said first and second valve members respectively when said stem is in said first and said second positions respectively, said valve stem having dispensing conduit means including a dispensing conduit through said second valve member and having also vent conduit means, and means for venting said pressure chamber to the atmosphere when said stem is in said first position including a vent conduit communicating through said first valve seat with said pressure chamber.

10. The combination of claim 3 in which separate vent means are provided to vent the container when the stem is in the second position.

11. The combination of claim 10 in which separate vent means are provided to vent the container when the stem is in the second position and including a separate vent conduit communicating with said container and a vent duct in said stem communicating between the atmosphere and the separate vent conduit when the stem is in the second position but out of communication when the stem is in the first position.

12. The dispenser of claim 2 in which the valve stem is limitedly rotatable about its axis, the dispenser including means for locking the valve stem at the first axial position but rotated to a position in which the valve stem conduit is also out of communication with said pressure chamber.

13. The dispenser of claim 6 in which the valve stem is limitedly rotatable about its axis and including means for locking the valve stem at the first axial position but rotated from the radial position of said venting conduits and the radial position of said dispensing conduits, said locking means comprising a radial pin on said stem, a cooperating guideway in said valve body and a detent for said pin in the rotated position of said stem, said biasing means causing said pin and detent to engage.

14. The dispenser of claim 9 in which the valve stem is limitedly rotatable about its axis and including means for locking the valve stem at the first axial position but rotated from the radial position of said venting conduits and the radial position of said dispensing conduits, said locking means comprising a radial pin on said stem, a cooperating guideway in said valve body and a detent for said pin in the rotated position of said stem, said biasing means causing said pin and detent to engage.

References Cited in the file of this patent

UNITED STATES PATENTS

| 2,514,773 | Kromer | July 11, 1950 |
| 2,822,002 | Mack | Feb. 4, 1958 |